(12) United States Patent
Smith

(10) Patent No.: US 11,338,617 B2
(45) Date of Patent: May 24, 2022

(54) VEHICLE RECOVERY DEVICE

(71) Applicant: Lorne Smith, Ferndale (AU)

(72) Inventor: Lorne Smith, Ferndale (AU)

( * ) Notice: Subject to any disclaimer, the term of this patent is extended or adjusted under 35 U.S.C. 154(b) by 685 days.

(21) Appl. No.: 16/339,709

(22) PCT Filed: Oct. 9, 2017

(86) PCT No.: PCT/AU2017/051090
§ 371 (c)(1),
(2) Date: Apr. 4, 2019

(87) PCT Pub. No.: WO2018/068083
PCT Pub. Date: Apr. 19, 2018

(65) Prior Publication Data
US 2019/0241016 A1     Aug. 8, 2019

(30) Foreign Application Priority Data
Oct. 11, 2016   (AU) ................................ 2016904099

(51) Int. Cl.
*B60B 39/12*     (2006.01)
(52) U.S. Cl.
CPC ........ *B60B 39/12* (2013.01); *B60B 2900/721* (2013.01); *B60B 2900/731* (2013.01)
(58) Field of Classification Search
CPC ......... B60B 39/00; B60B 39/12; B60B 15/00; B60B 2900/721; B60C 27/00; E01C 9/08; E01C 9/086; E01C 9/083; E01C 5/005; B65D 11/1866; B65D 11/1873; B65D 11/188; B65D 11/1893

USPC ............................................... 238/14
See application file for complete search history.

(56) References Cited

U.S. PATENT DOCUMENTS

| | | | | |
|---|---|---|---|---|
| 1,261,898 | A * | 4/1918 | Bishop | B60B 39/12 238/14 |
| 5,439,171 | A * | 8/1995 | Fruend | B60B 39/12 238/14 |
| 7,185,778 | B1 * | 3/2007 | Palley | B65D 88/14 220/692 |
| 2005/0257484 | A1 * | 11/2005 | Aaron | E01C 9/08 52/712 |
| 2009/0114645 | A1 * | 5/2009 | Zemer | B65D 11/1873 220/6 |
| 2012/0012663 | A1 * | 1/2012 | Studstill | B60B 39/00 238/14 |
| 2016/0017547 | A1 * | 1/2016 | Bordelon | E01C 5/003 404/47 |
| 2017/0136835 | A1 * | 5/2017 | de Paz | B60C 27/06 |

* cited by examiner

*Primary Examiner* — S. Joseph Morano
*Assistant Examiner* — Cheng Lin
(74) *Attorney, Agent, or Firm* — Tope-McKay & Associates

(57) ABSTRACT

A vehicle recovery device (10) comprising a first track (12) formed from a plurality of pivotally connected panels (14) and a second track (13) formed from a plurality of pivotally connected panels (14). The first and second tracks (12, 13) are moveable from a planar configuration, in which the first and second tracks (12, 13) are usable for vehicle recovery, to a folded configuration, in which the first and second tracks (12, 13) are connectable by connectors (22) to form side walls of a receptacle (11) in the shape of a polyhedron.

10 Claims, 11 Drawing Sheets

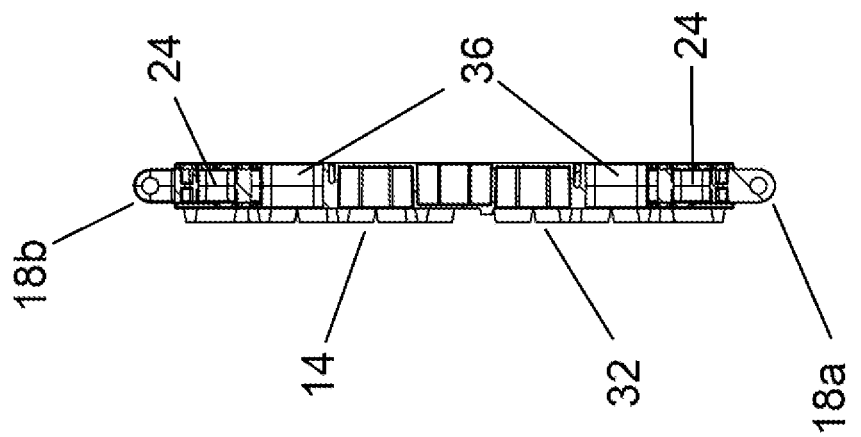
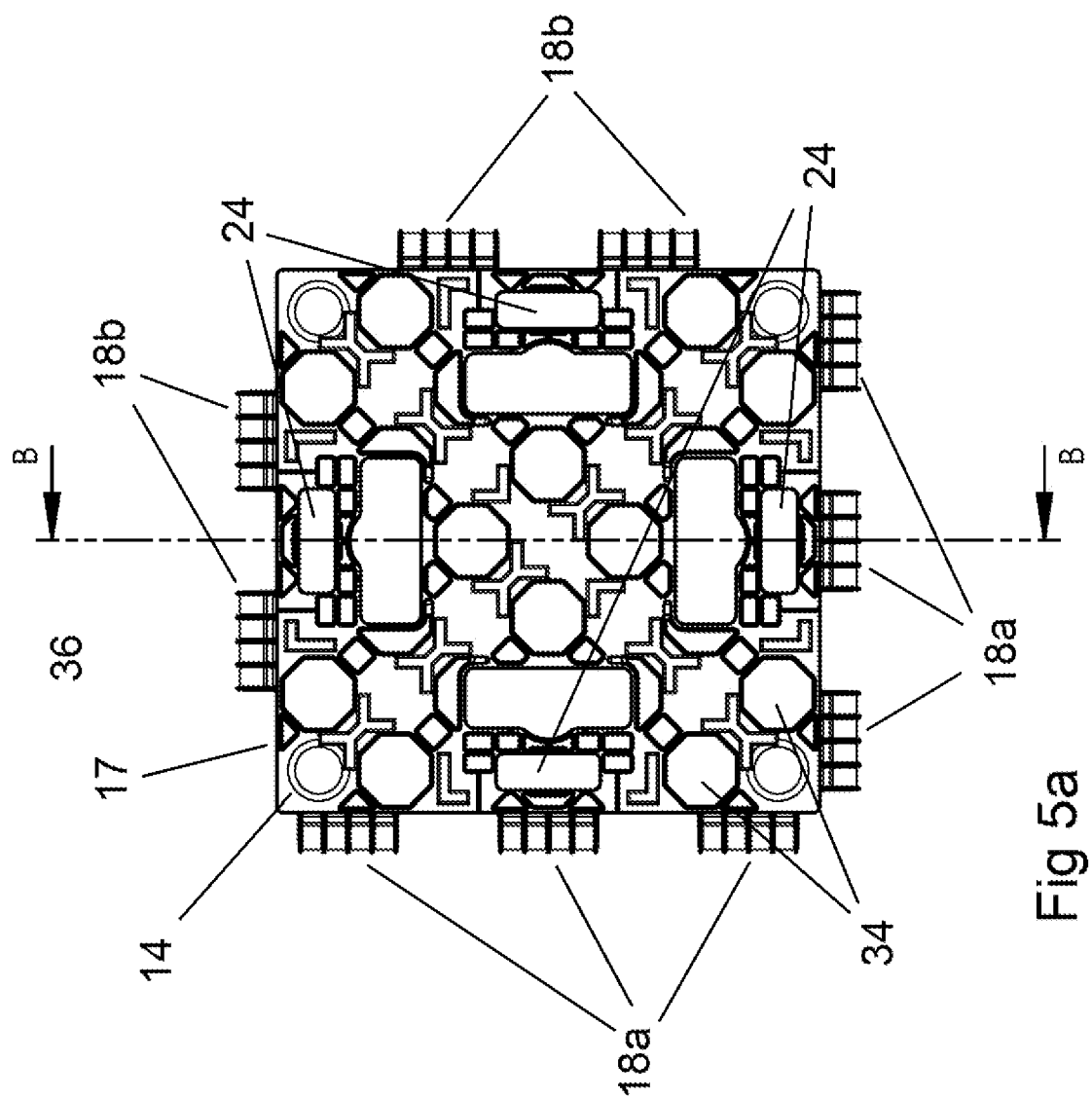

VEHICLE RECOVERY DEVICE

FIELD OF THE INVENTION

The present invention relates to a device provided for assisting vehicles gain traction on sandy soils.

BACKGROUND TO THE INVENTION

Four-wheel drive vehicles commonly carry equipment to assist when the vehicle becomes stuck in sandy or unstable soil. For example, mats or tracks may be used which can be placed on the ground in front of the wheels for the vehicle to drive over. While such mats are effective in assisting the vehicle gain traction, they are often relatively large and take up a reasonable amount of space in the vehicle when not in use.

The present invention relates to a vehicle recovery device which can be used in the manner of current recovery tracks and which is aimed at being easier to store and also providing additional functionality when not in use.

SUMMARY OF THE INVENTION

According to one aspect of the present invention there is provided a vehicle recovery device comprising:
a first track formed from a plurality of pivotally connected panels; and
a second track formed from a plurality of pivotally connected panels;
wherein the first and second tracks are moveable from a planar configuration, in which the first and second tracks are usable for vehicle recovery, to a folded configuration, in which the first and second tracks are connectable by connectors to form side walls of a receptacle in the shape of a polyhedron.

Preferably each of the first and second tracks comprises three rectangular panels, pivotally connected in series such that, the first and second tracks are connectable to form an upper wall, a lower wall and side walls of the receptacle, the receptacle being formed in the shape of a rectangular prism.

In a preferred embodiment the panels are square and the receptacle formed is a cube shape.

Preferably opposed ends of each of the panels are provided with hinge barrels, the hinge barrels on a first of the ends being offset from the hinge barrels on a second end such that the hinge barrels may be interleaved and connected by a hinge pin to form the pivotal connection between the panels.

Preferably the connectors each comprises first and second plugs connected by a flexible band, the first and second plugs being received in apertures provided adjacent the periphery of the panels.

Preferably the plugs comprise tubular protrusions having a rectangular transverse cross section and the apertures are rectangular in shape.

In a preferred embodiment, walls of the tubular protrusions of each of the plugs include flexible tabs therein having lugs extending outwardly therefrom to engage with edges of the apertures.

Preferably each of the panels includes protrusions on the surfaces thereof to provide grip between the surface of the tracks and wheels of a vehicle and the ground.

Preferably the panels are also provided with a plurality of holes therein.

Preferably a plurality of openings are provided being elongate in shape and located adjacent each of the ends and sides to form handles for lifting the receptacle.

BRIEF DESCRIPTION OF THE DRAWINGS

The invention will now be described, by way of example, with reference to the following drawings, in which:

FIG. 5a is a front view of the panel of FIG. 3;

FIG. 5b is a cross sectional view of the panel of FIG. 5a through the line B-B;

DETAILED DESCRIPTION OF PREFERRED EMBODIMENTS

Figure 1:
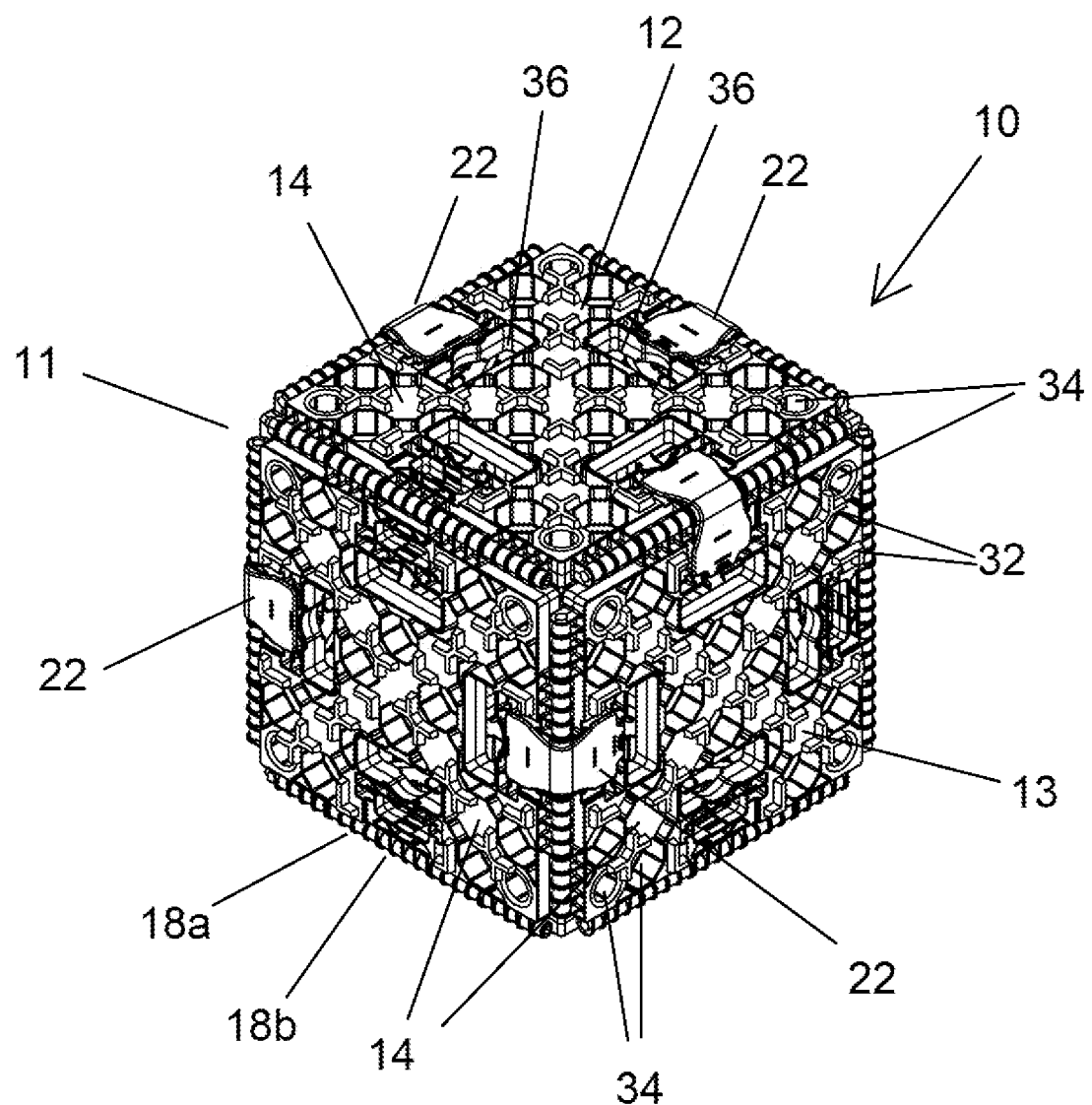
FIG. 1 is an upper perspective view of a vehicle recovery device in accordance with the present invention in a stored configuration.
Figure 2A:
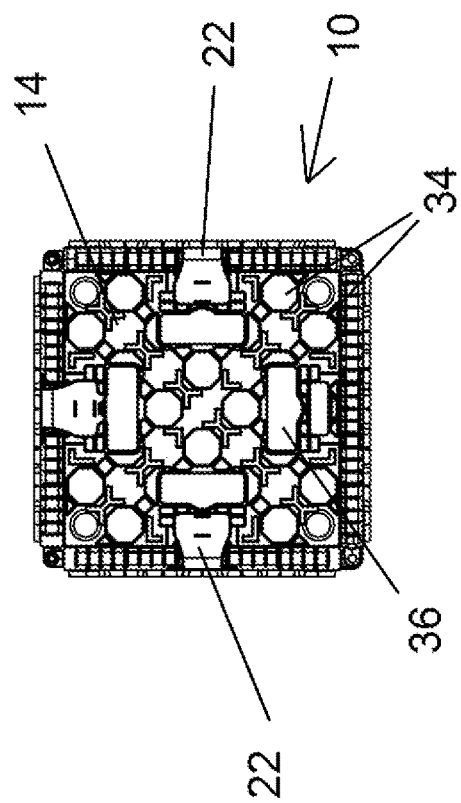
FIG. 2a is a top view of the vehicle recovery device of FIG. 1.
Figure 2B:
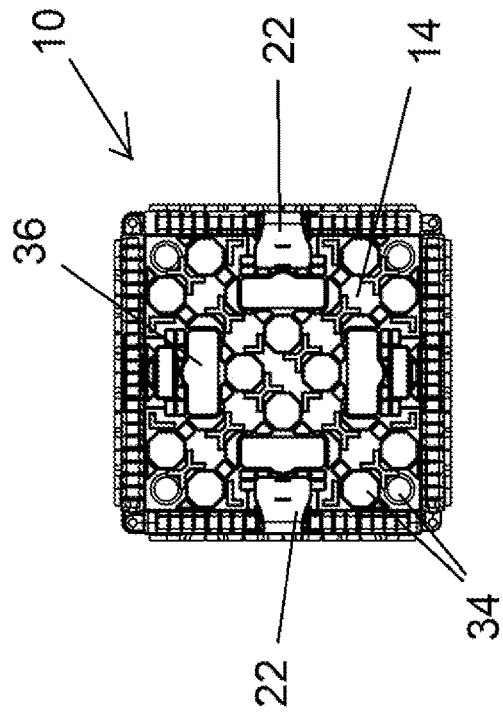
FIG. 2b is a first side view of the vehicle recovery device of FIG. 1.
Figure 2C:
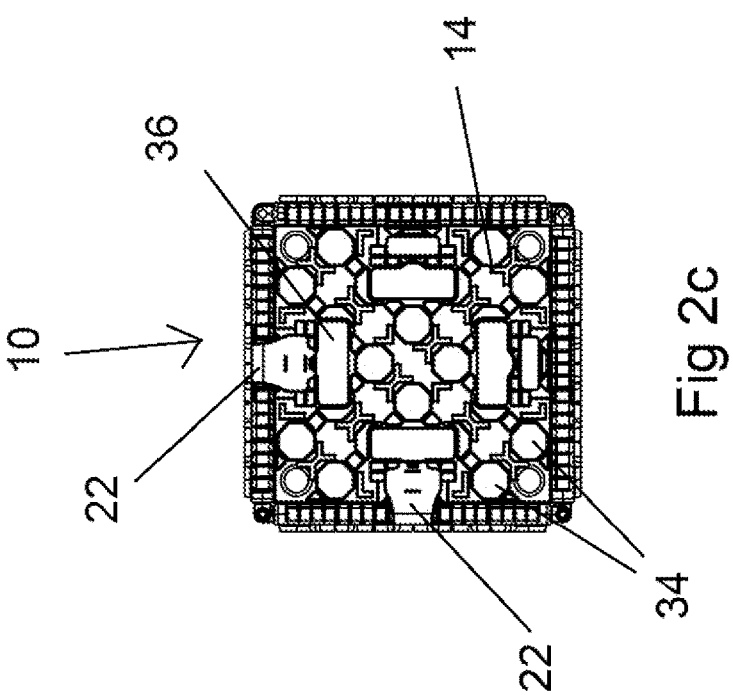
FIG. 2c is a second side view of the vehicle recovery device of FIG. 1.
Figure 3:
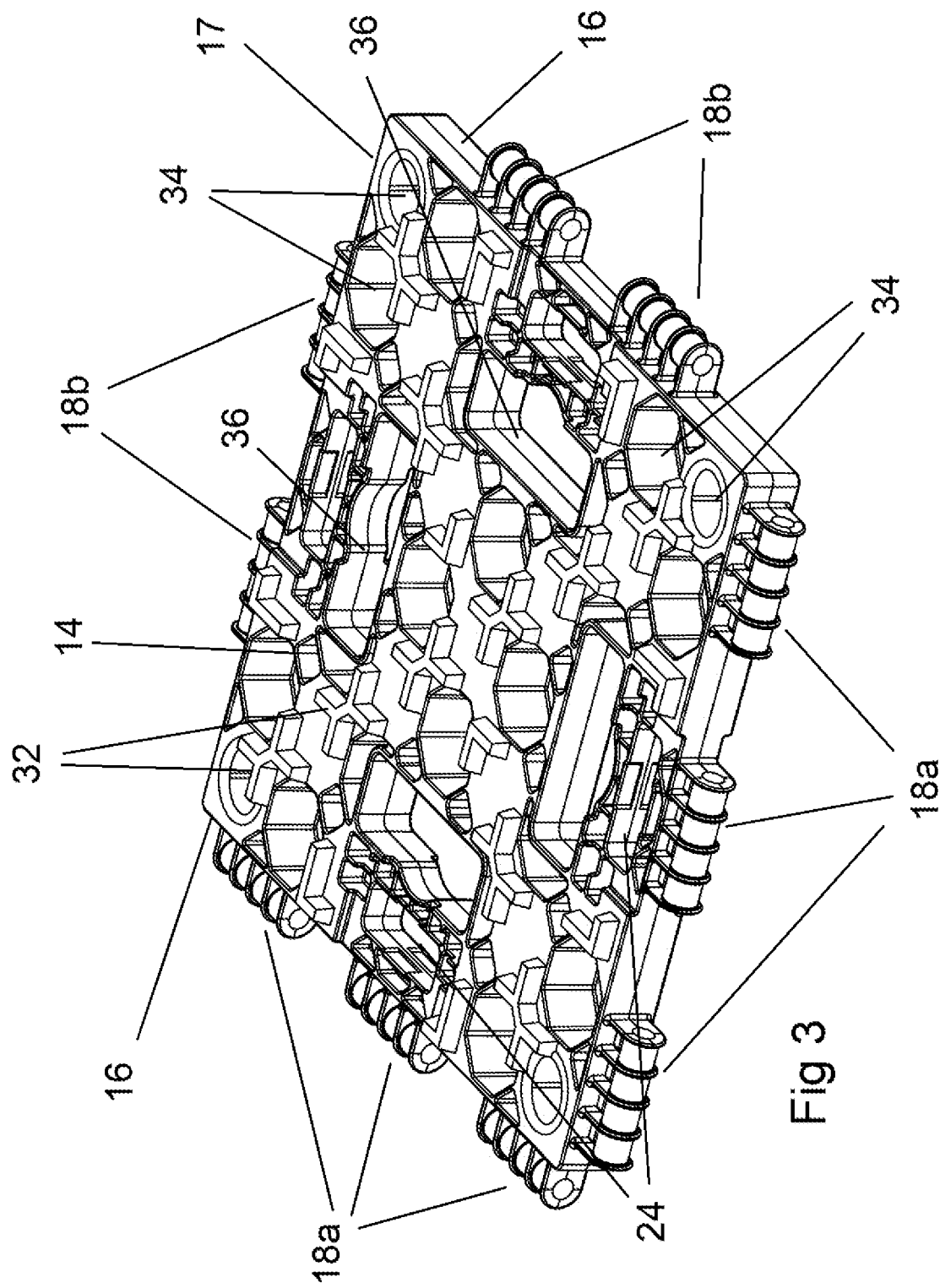
FIG. 3 is an upper perspective view of a panel of the vehicle recovery device of FIG. 1.
Figure 4B:
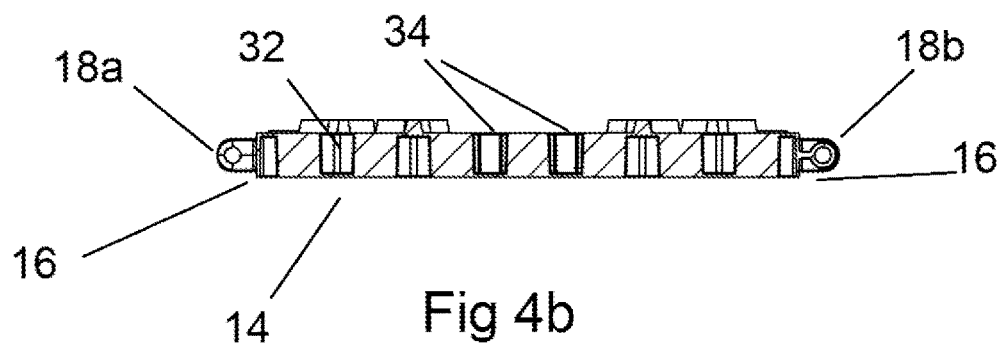
FIG. 4b is a cross sectional view of the panel of FIG. 4a through the line C-C.
Figure 4A:
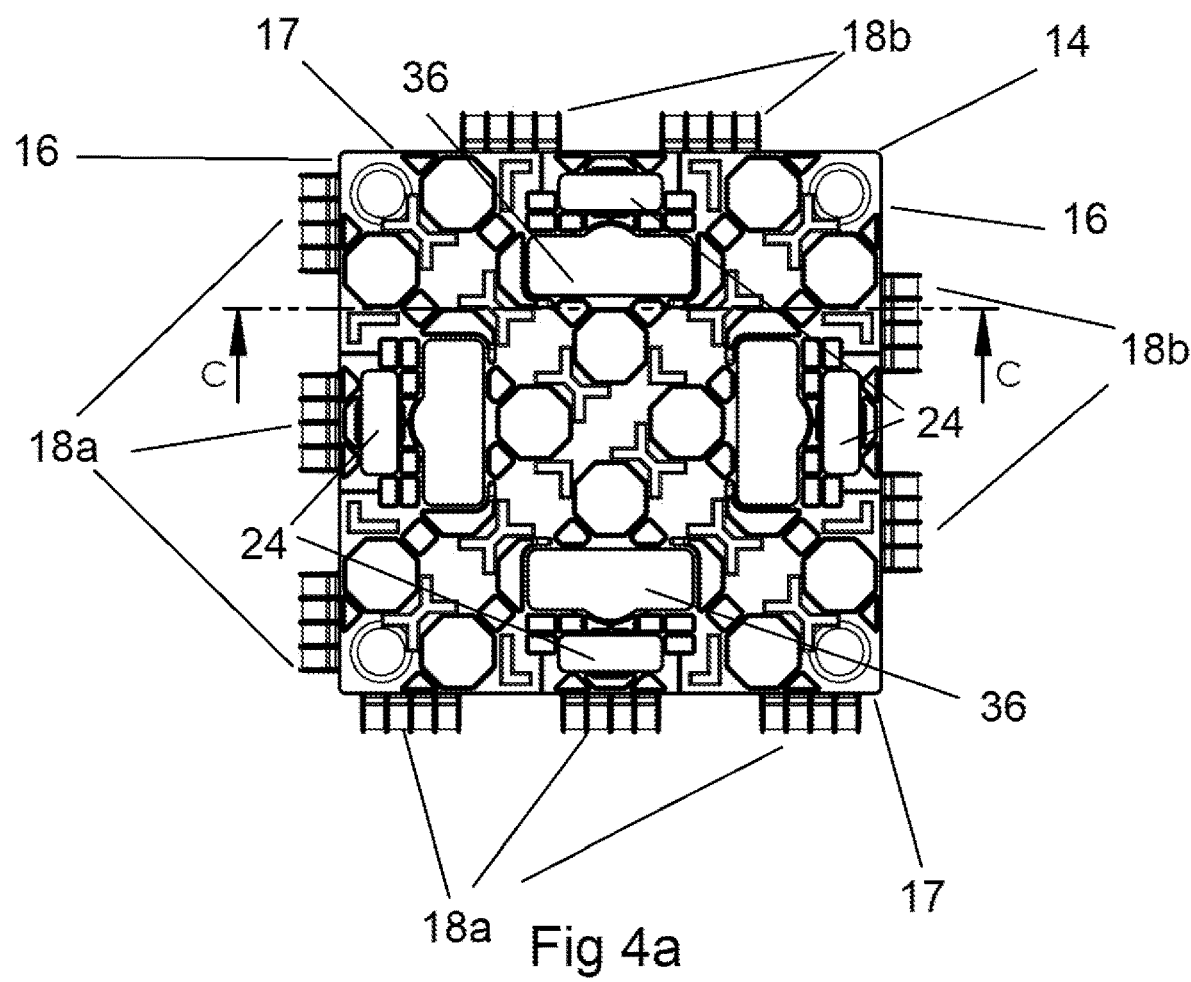
FIG. 4a is a front view of the panel of FIG. 3.

Referring to the Figures, there is shown a vehicle recovery device 10 comprising a first track 12 and a second track 13. Each of the tracks 12 and 13 comprises an elongate planar member which may be place adjacent a wheel of a vehicle such that, when the vehicle drives over the tracks 12 and 13, the tracks 12 and 13 provide additional grip.

Each of the first and second tracks 12 and 13 are formed from a plurality of panels 14. Each of the panels 14 comprises a planar member pivotally connected in series with the other panels 14 of the first or second track 12 or 13. The first and second tracks 12 and 13 are therefore moveable between a planar configuration, in which each of the panels 14 within the track 12 or 13 is coplanar, and a folded configuration, in which each of the panels 14 is oriented at an angle to the adjacent panels 14 in the track 12 or 13.

Figure 6:
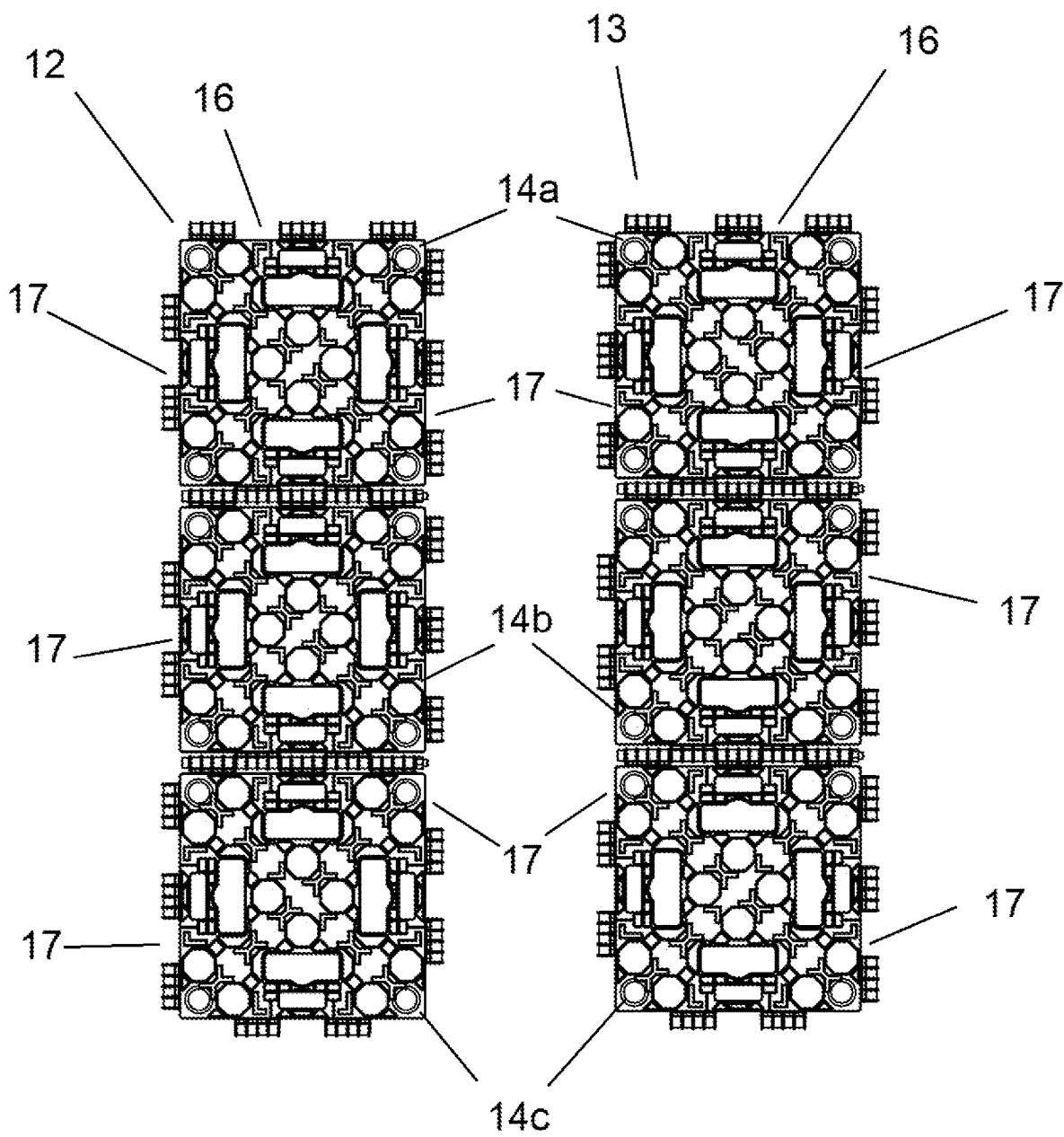
FIG. 6 is a view of the vehicle recovery device of FIG. 1 in a disassembled configuration for use in vehicle recovery.
Figure 7:
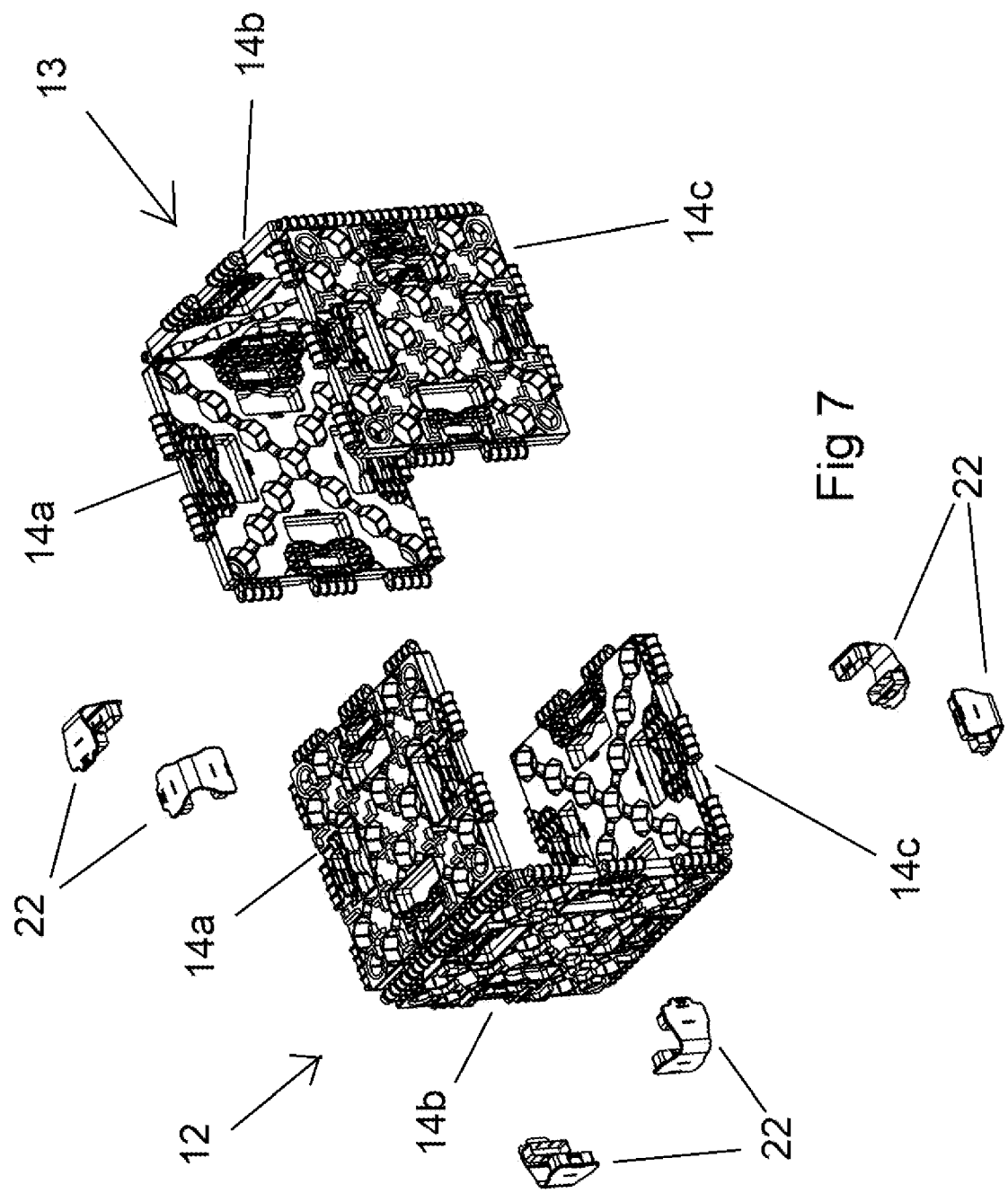
FIG. 7 is an exploded view of the vehicle recovery device of FIG. 1.

In the embodiment shown, each of the panels 14 is rectangular in shape and each track 12 and 13 comprises a first panel 14a, a second panel 14b and a third panel 14c. The first, second and third panels 14a, 14b and 14c are connected together in series such that, in the planar configuration (as shown in FIG. 6), the tracks 12 and 13 each comprise an elongate planar member being three panels 14 in length and one panel 14 in width. In the folded configuration, each of the panels 14 is oriented perpendicular to each of the adjacent panels 14.

Each of the panels 14 comprises opposed ends 16 and opposed sides 17 (as best seen in FIG. 6). Each of the tracks 12 and 13 is formed by pivotal connections provided between the adjacent ends 16 of the panels 14. That is, the first, second and third panels 14a, 14b and 14c are connected end to end to form elongate rectangular tracks 12 and 13.

When in the folded configuration, the first and second tracks 12 and 13 are connectable together to form a receptacle 11 being a polyhedron shape. In the embodiment shown in which the panels 14 are rectangular, the receptacle 11 is a rectangular prism in shape where the first, second and third walls 14a, 14b and 14c of the first track 12 form a base wall, a first side wall and an upper wall of the receptacle 11 respectively. The first, second and third panels 14a, 14b and 14c of the second track 13 form second, third and fourth side walls of the receptacle 11 respectively.

In the embodiment shown, each of the panels 14 is of the same shape and is square. The resulting receptacle 11 is therefore formed into a cube shape.

The pivotal connection between adjacent panels 14 is provided by hinge barrels 18 provided on each of the ends 16 of panels 14. A first of the ends 16 is provided first hinge barrels 18a and a second of the ends 16 is provided with second hinge barrels 18b. The first hinge barrels 18a are offset from the second hinge barrels 18b such that when the first of the ends 16 of one of the panels 14 is placed adjacent a second of the ends 16 of an adjacent panel 14, the first and second hinge barrels 18 are interleaved. A hinge pin (not shown) may be passed through the interleaved first and second hinge barrels 18a and 18b. In the embodiment shown, the first hinge barrels 18a comprise a pair of hinge barrels and the second hinge barrels 18b comprise three hinge barrels.

A first of the sides 17 of each of the panels 14 is provided also with first hinge barrels 18a and a second of the sides 17 of each of the panels 14 is provided with second hinge barrels 18b. The first and second hinge barrels 18a and 18b engage between the second and first hinge barrels 18b and 18a of the adjacent panels 14 when the tracks 12 and 13 are connected to form the receptacle 11. The hinge barrels 18a and 18b therefore aid in locating the adjacent sides 17 of the panels 14 together in the correct position. Further, the arrangement shown in which each of the panels 14 has first or second hinge barrels 18a and 18b on all sides allows only a single configuration of panel 14 to be produced to create the receptacle 11.

The peripheries of each of the first and second tracks 12 and 13 are connectable in order to form the receptacle 11. A plurality of connectors 22 are provided to connect between adjacent ends and sides 16 and 17 of the panels 14 of the first and second tracks 12 and 13. In the embodiment shown, each of the panels 14 includes a plurality of apertures 24 located adjacent the ends 16 and the sides 17. The connectors 22 are provided to engage into one of the apertures 24 on the first track 12 and an adjacent aperture 24 on the second track 13 to connect the peripheries of the adjacent tracks 12 and 13 together in the shape of the receptacle 11.

Each of the connectors 22 in the embodiment shown comprises first and second plugs 26 and 27 connected by a flexible band 28. Each of the plugs 26 and 27 is shaped to be received in one of the apertures 24 of the panels 14 adjacent an edge thereof.

The plugs 26 and 27 in the embodiment shown comprise tubular protrusions 38 having a rectangular transverse cross section. The apertures 24 are rectangular in shape such that the tubular protrusions 38 engage against inner surfaces of the apertures 24. Walls of the tubular protrusions 38 of each of the plugs 26 and 27 include flexible tabs 31 therein having lugs 30 extending outwardly from the outer wall of the tubular protrusions 38. The lugs 30 engage with the edges of the apertures 24, causing the tabs 31 to flex inwardly. When the tubular protrusions 38 have passed through the apertures 24, the tabs 31 flex outwardly and the lugs 30 thereby engage the panels 14. The bands 28 are flexible such that the bands 28 may bend around the perpendicular connection between an adjacent pair of panels 14.

Each of the panels 14 includes also protrusions 32 on the surfaces thereof. The protrusions 32 provide additional grip between the surface of the tracks 12 and 13 and both the wheels of a vehicle and the ground in use. The panels 14 are also provided with a plurality of holes 34 therein. Further, a plurality of openings 36 are provided. The openings 36 are elongate in shape and located adjacent each of the ends 16 and sides 17 to form handles for lifting the receptacle 11.

Figure 8:
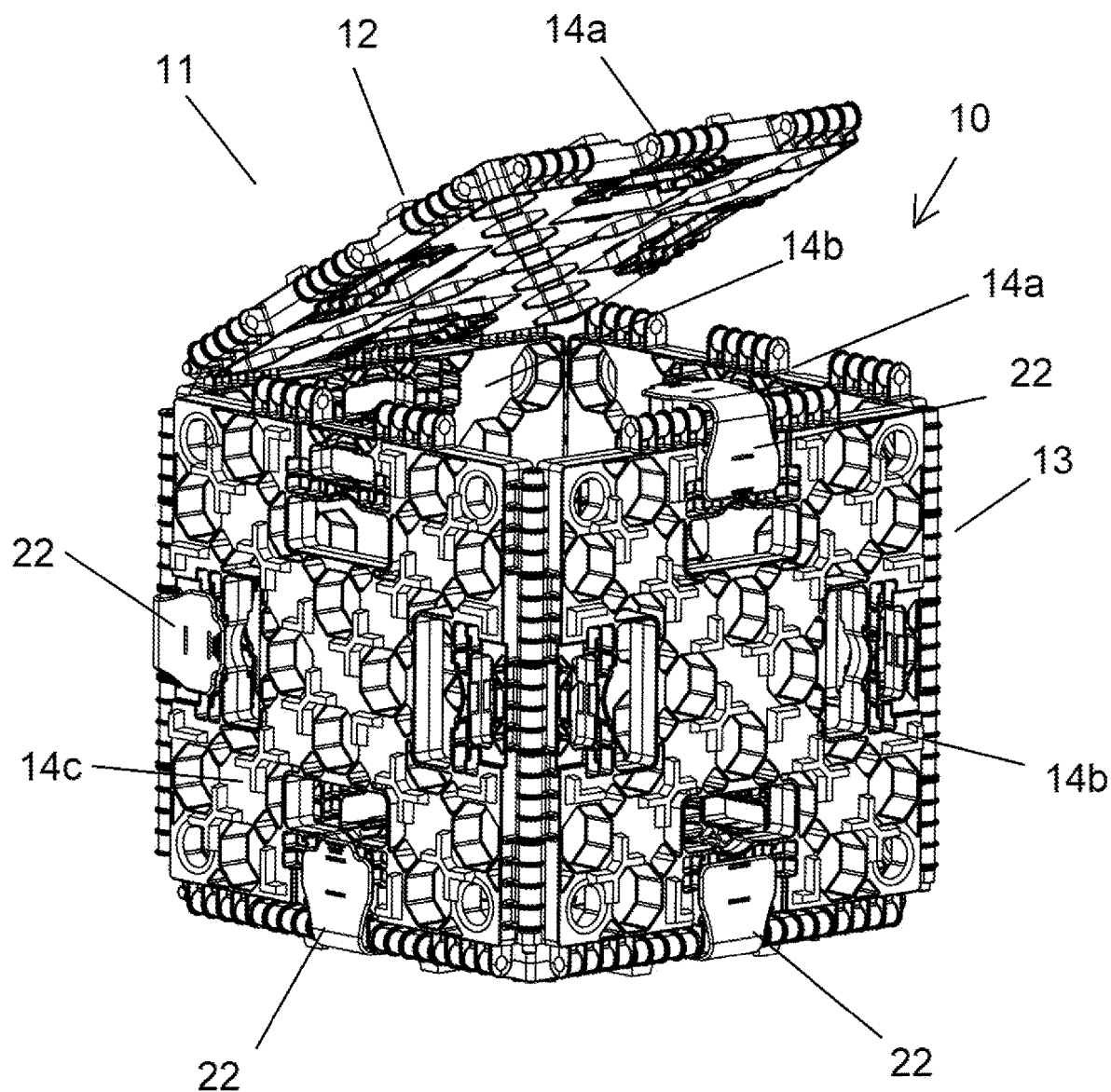
FIG. 8 is an upper perspective view of the vehicle recovery device of FIG. 1 showing opening of the receptacle by pivoting an upper panel.
Figure 9:
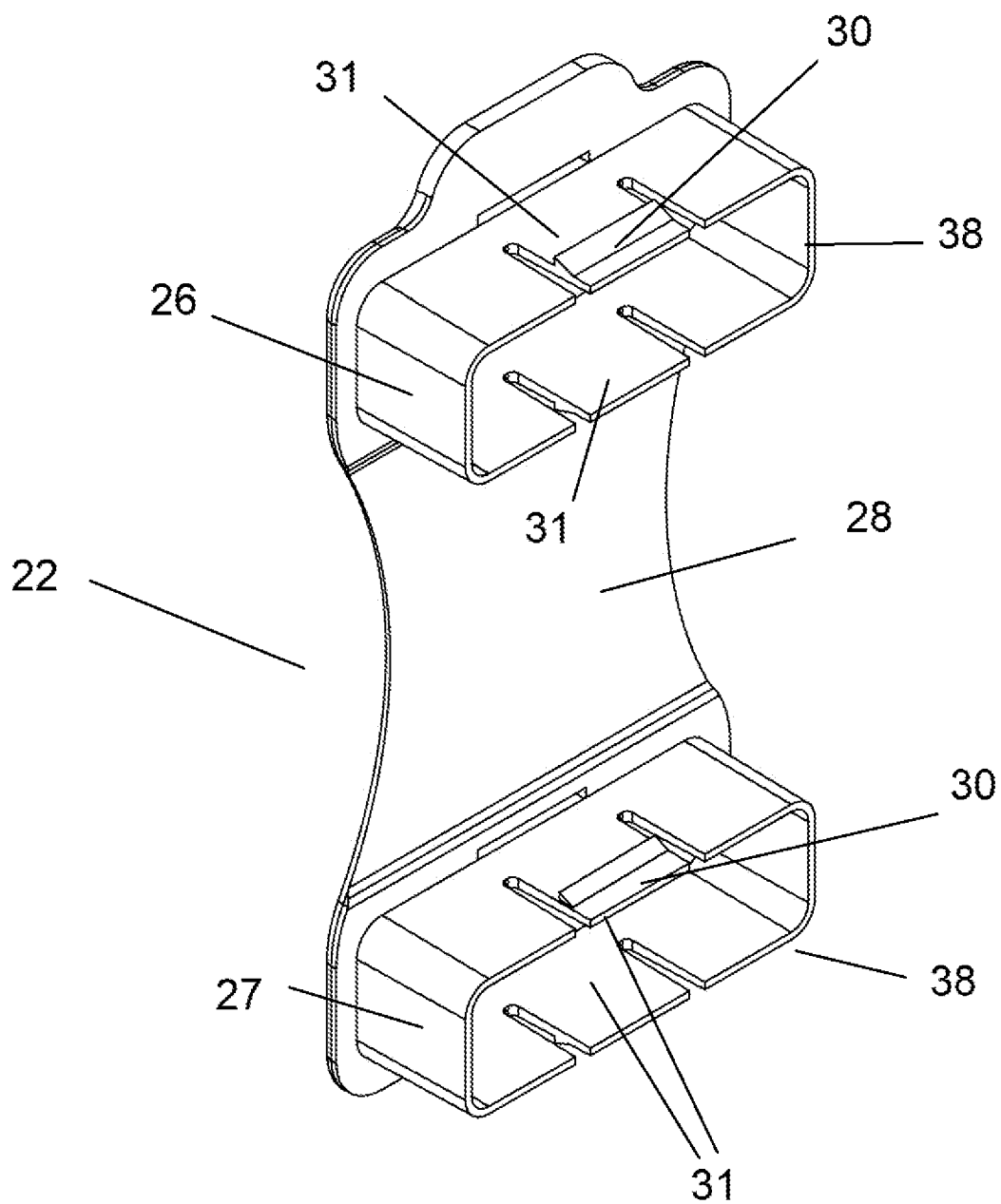
FIG. 9 is an upper perspective view of a connector of the vehicle recovery device of FIG. 1.
Figure 10B:
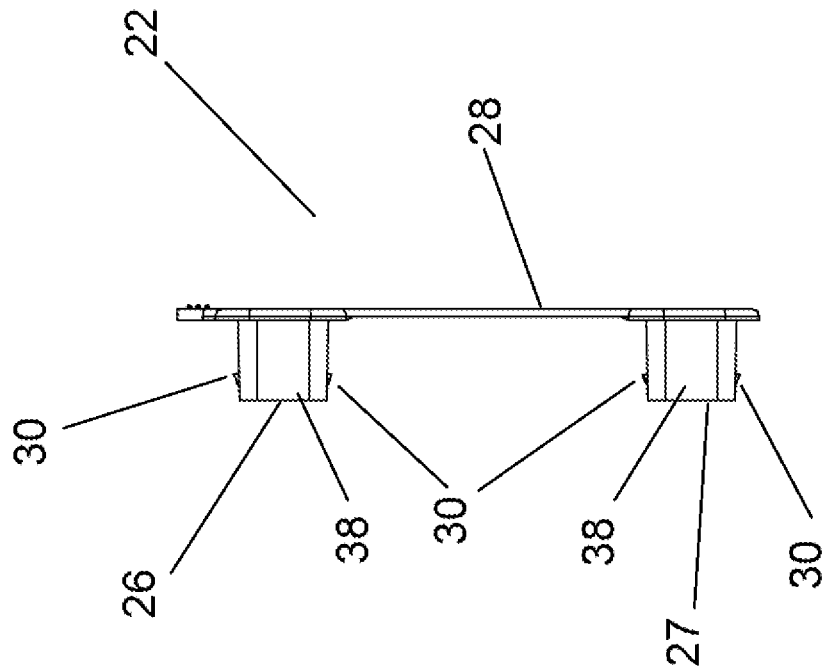
FIG. 10b is a side view of the connector of FIG. 9.
Figure 10A:
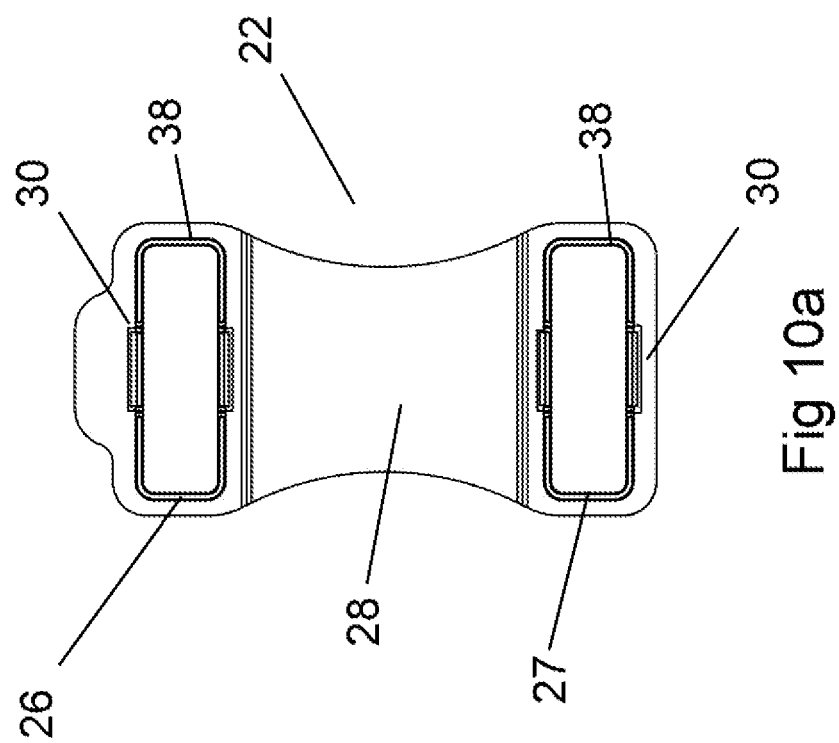
FIG. 10a is a front view of the connector of FIG. 9.
Figure 11B:
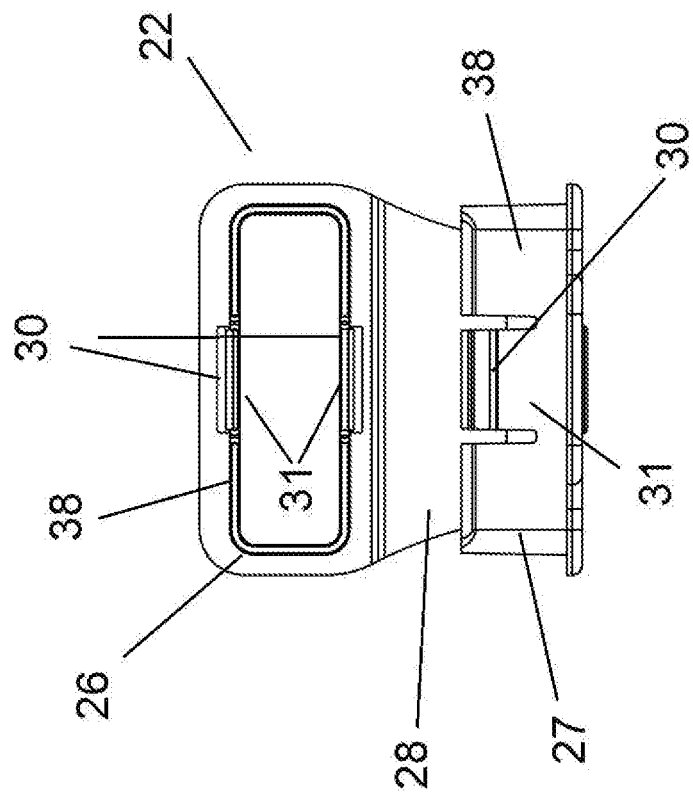
FIG. 11b is a front view of the connector in the bent configuration.
Figure 11A:
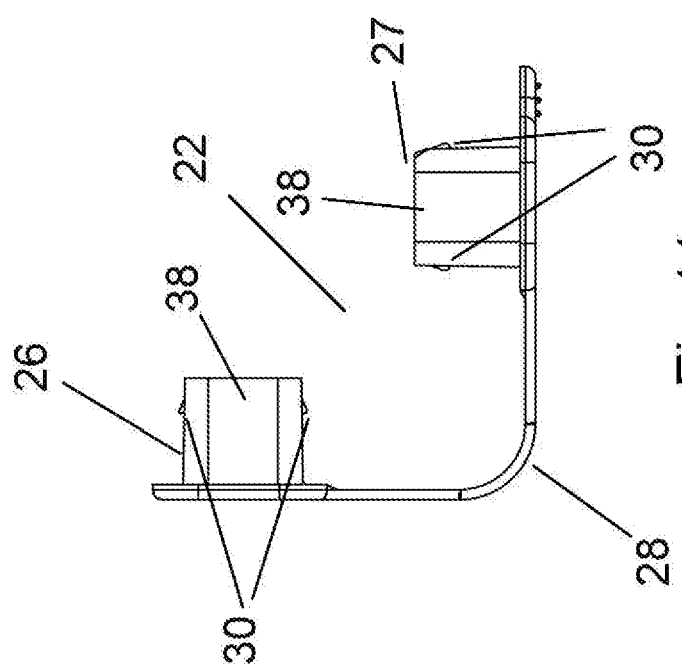
FIG. 11a is a side view of the connector in a bent configuration.

In use, the first and second tracks 12 and 13 may be connected together to form a rectangular prism shaped receptacle 11, as shown in FIG. 1. The upper wall of the receptacle 11 may be released by removal of the connectors 22 such that it may be opened to form a lid of the receptacle 11 (as shown in FIG. 8). The vehicle recovery device 10 may therefore be stored within a vehicle in a condition in which it can be used for storage of other items. The receptacle 11 may be secured in place within the vehicle by suitable tie down straps or cables (not shown) which may be passed through the holes 34.

If the vehicle recovery device 10 is required for use in recovery of a vehicle, the connectors 22 may be removed to separate the first and second tracks 12 and 13. The panels 14 of the first and second tracks 12 and 13 are then pivoted such that the tracks 12 and 13 are in the planar configuration and the tracks 12 and 13 may be placed in front of or behind the wheels of the vehicle such that the vehicle may drive along the tracks in a known manner.

The vehicle recovery device 10 therefore provides an effective and useful means for storing the tracks 12 and 13 within the vehicle. As four-wheel drive vehicles will often use receptacles for carrying other equipment, no additional space may be required for storage of the vehicle recovery device 10 when not in use.

It will be readily apparent to persons skilled in the relevant arts that various modifications and improvements may be made to the foregoing embodiments, in addition to those already described, without departing from the basic inventive concepts of the present invention.

What is claimed is:

1. A vehicle recovery device comprising:
   a first track formed from a plurality of pivotally connected panels; and
   a second track formed from a plurality of pivotally connected panels;
   wherein the first and second tracks are moveable from a planar configuration, in which the first and second tracks are usable for vehicle recovery, to a folded configuration, in which the first and second tracks are connectable by connectors to form side walls of a receptacle in the shape of a polyhedron.

2. The vehicle recovery device in accordance with claim 1, wherein each of the first and second tracks comprises three rectangular panels, pivotally connected in series such that, the first and second tracks are connectable to form an upper wall, a lower wall and side walls of the receptacle, the receptacle being formed in the shape of a rectangular prism.

3. The vehicle recovery device in accordance with claim 2, wherein the panels are square and the receptacle formed is a cube shape.

4. The vehicle recovery device in accordance with claim 1, wherein opposed ends of each of the panels are provided with hinge barrels, the hinge barrels on a first of the ends being offset from the hinge barrels on a second end such that the hinge barrels may be interleaved and connected by a hinge pin to form the pivotal connection between the panels.

5. The vehicle recovery device in accordance with claim 1, wherein the connectors each comprises first and second plugs connected by a flexible band, the first and second plugs being received in apertures provided adjacent the periphery of the panels.

6. The vehicle recovery device in accordance with claim 5, wherein the plugs comprise tubular protrusions having a rectangular transverse cross section and the apertures are rectangular in shape.

7. The vehicle recovery device in accordance with claim 6, wherein walls of the tubular protrusions of each of the plugs include flexible tabs therein having lugs extending outwardly therefrom to engage with edges of the apertures.

8. The vehicle recovery device in accordance with claim 7, wherein each of the panels includes protrusions on the surfaces thereof to provide grip between the surface of the tracks and wheels of a vehicle and the ground.

9. The vehicle recovery device in accordance with claim 1, wherein the panels are also provided with a plurality of holes therein.

10. The vehicle recovery device in accordance with claim 1, wherein a plurality of openings are provided being elongate in shape and located adjacent each of the ends and sides to form handles for lifting the receptacle.

* * * * *